Figure 1:
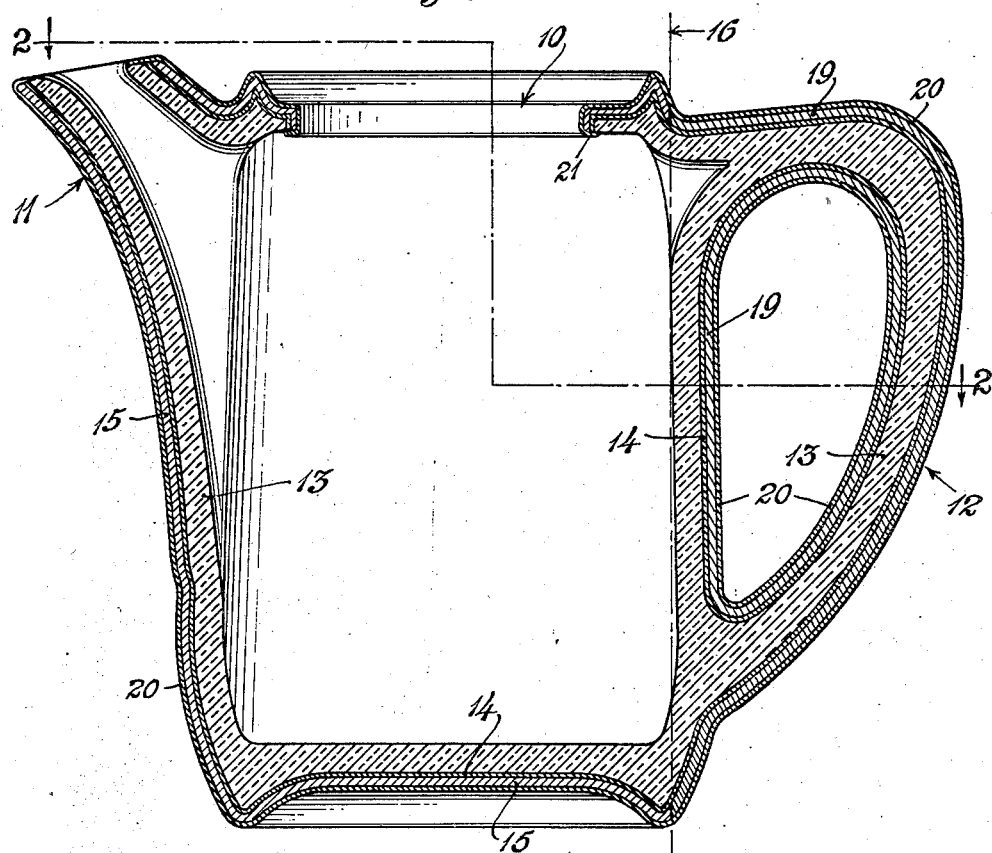

July 29, 1947. E. T. RAHM 2,424,583
PLATED ARTICLE AND METHOD OF MANUFACTURING SAME
Filed Nov. 3, 1941

INVENTOR
ERIK T. RAHM
BY
ATTORNEYS

Patented July 29, 1947

2,424,583

UNITED STATES PATENT OFFICE 2,424,583

PLATED ARTICLE AND METHOD OF MANUFACTURING SAME

Erik T. Rahm, Stockholm, Sweden, assignor of forty-five per cent to Gunnar Edward Ferdinand Palm, Calle Altamirano, Mexico Application November 3, 1941, Serial No. 417,718

4 Claims. (Cl. 220—64)

The present invention relates to containers and hollow ware generally, and particularly to the provision of a metallic coating or casing on containers made of relatively brittle or weak material, such as vitreous, semi-vitreous and other ceramic and plastic ware, and especially containers for hot liquids, such as coffee or tea pots employed in restaurants, hotels, homes, etc.

Containers for liquids, such as beverages, foods, etc., are generally made of either an electrically non-conducting material like china, porcelain, glass and similar ceramic and vitreous material and also of other plastics, such as resins and the like; or they are made from various kinds of metals. Each of these groups of materials has certain advantages from the standpoint of containers, especially for foods, and each at the same time possesses certain disadvantages. Containers made of plastics, by which term I include vitreous and semi-vitreous ware, such as glass, china and porcelain and also resins, and the like, are characterized by the fact that they do not ordinarily alter the taste or flavor of the liquid or food in contact with them, whereas metals, particularly the non-noble metals, usually do. Containers made of plastic material, furthermore, are usually cheaper to manufacture and can be made in a large variety of shapes and forms and with various kinds of ornamentation, which are usually very difficult and sometimes impossible to obtain in all-metal containers, and generally not without considerably increased cost. On the other hand, plastic ware, especially of the ceramic and vitreous type, is usually very brittle and only in relatively small degree resistant to shock, in which respect it is decidedly inferior to metal hollow ware. Plastic ware of the ceramic type produced by molding of various kinds of clays, followed by firing, becomes even more brittle when the article is subjected to an additional firing. The handles and spouts of tea and coffee pots are especially subject to damage because of their exposure, and become rather easily broken off, through careless handling, but especially during cleaning in washing machines. The mouth of the spout is also easily chipped, producing a break in the surface glaze, the exposed porous interior then not only spoiling the appearance of the pot, but furnishing a favorable culture ground for bacteria; so much so, that hotels and restaurants frequently discard ceramic coffee and tea pots and the like which have become even only slightly damaged at the mouth of the spout. These serious disadvantages have greatly militated against more widespread use of ceramic ware of the type in question, despite the fact that such ware can usually be made more pleasing in appearance and more cheaply than metal ware, and is inert to foods and beverages.

All metal containers, on the other hand, aside from their greater cost, greater weight for the same bulk, the limitations in the designs that can be produced at a reasonable cost, and their tendency to impair the flavor of the contained food or beverage, have the further disadvantage that the handle usually becomes too hot to the touch when the container is filled with a hot liquid. Various expedients have been resorted to to keep the handle cool enough for contact with the fingers, but none has proved entirely satisfactory. A common device has been the interposition of a poorly heat-conducting material, such as a disc or block of ebony, Bakelite and the like, but this has involved a weakening of the structure between the body and the handle at the junctures therebetween. Hollow stumps are usually provided upon the body of the container and jut out therefrom, and the handle, which may be made hollow, is secured to the pot by way of the insulating material which is connected to the metal by riveting or other means. It has, however, been found in practice that this mode of attachment is rather short-lived because the joints are loosened by the alkaline materials in the washing compounds, and usually part after about ninety days' use in a restaurant or hotel. Moreover, the mechanical stresses set up at the joints hasten this loosening; while the rivets, which are usually of different material from the metal of the container, promote corrosion at the joints.

Another common method of hindering the passage of heat into the metal handle has been the pinching of the ends of the hollow tube forming the handle, usually into two prongs, thereby allowing only a small area of contact between the body of the container and the handle or handles. The handle is then secured to the body by means of soldering. This is perhaps the most effective of the common methods, but is more expensive than the one previously described. However, the structure involves a considerable weakening at the junction between body and handle, so that a jolt or series of jolts will frequently loosen the handle or even break it off. This mode of attachment is usually not as efficient from the standpoint of hindering the passage of heat into the handle but is generally recognized as being superior to the use of an intermediate insulating disc or block from the standpoint of sturdiness, appearance and quality of workmanship.

Another common way of protecting the hand against hot metallic handles is to clothe the latter with non-conducting material such as bast, rubber, raffia, straw and the like. The disadvanges of such clothing are however quite obvious. They are not durable, are not resistant to the alkaline washing compounds, and moreover favor the collection of dirt and bacteria. They are accordingly quite unsanitary. The clothing material must, therefore, be frequently replaced, thereby involving additional expense.

Handles have also been made entirely of a material different from that of the body of the metal container, for example of ebony, Bakelite, or other poor heat conductor, but in such case one or more of the disadvantages of weakening or corrosion at the joints, increased cost, impaired appearance, etc., arise.

It is one of the objects of the invention to provide hollow ware and utensils of various kinds provided with handles, with or without other appendages, like spouts, with a metallic coating of such thickness and strength that the otherwise vulnerable handle becomes quite as strong as the body of the article, while the point or points of juncture with the body of the article are greatly reinforced by the surrounding tubular metal shell, and breakage of the handle, particularly at such point of juncture, thereby reduced to a minimum. It is also an object of the invention to provide hollow ware, and especially containers for beverages, such as coffee and tea pots, and also casseroles, soup dishes, tureens, cups, etc., that is, both containers which receive a hot liquid for immediate consumption and utensils employed for baking, frying, stewing and other cooking purposes, which possess the advantages both of ceramic (or other plastic) ware and likewise of metal ware and with the disadvantages of neither of these groups of materials.

More particularly, it is an object of the invention to provide containers having the pleasing body, and intricate shapes and ornamentations obtainable with ceramic and similar ware combined with the relative lightness of such ware as compared with metal, together with the strength and desirable surface luster of metal ware. Other objects of the invention will appear hereinafter.

In carrying out these objects of the invention, I coat an article made of china, porcelain, glass, or other plastic and relatively weak or brittle material with a metallic coating which is of such thickness that it constitutes a self-supporting shell and thereby forms a reinforcing framework about the base material. This metal shell is preferably of about 10 one-thousandths of an inch in thickness but may vary from about 8 to 16 thousandths of an inch. In other words, the metal coating on the base material does not rely upon the base itself for strength but rather itself constitutes a protecting shell about the relatively weak and brittle base. This protecting shell is sufficiently strong to absorb shocks and jars which ordinarily would cause breakage or cracking of a ceramic or vitreous container. The metal shell encloses not only the body but also the handle or handles of the container, and also the spout, where such appendage exists, the metallic shell being continuous and free from breaks or the interposition of a non-metallic material.

The metallic shell is preferably, although not necessarily, composed of a plurality of layers of metal; where a plurality of layers is employed, the rigidity of the shell is preferably provided primarily by only one of the layers of metal. In a multi-layer shell, the first layer of metal may be one formed on the surface of the ceramic or other non-conducting article in order to make the same sufficiently conductive to receive an electrolytic coating of metal forming the main body of the metallic shell. This last mentioned coat is preferably copper, whose use is desirable because of its ease of electrolytic deposition, low cost, strength, resilience, and elasticity, and also because it can be easily buffed and forms an excellent base for a final coating of a decorative metal like nickel, chromium, silver, gold and the like. These metal layers, in their totality, have a thickness which, as already indicated, is from about 8 to 16 or more thousandths of an inch.

Where copper or other good heat conductor is employed throughout both the body and the handles of a coffee or tea pot or other article adapted to be filled with a hot liquid or the like, the highly heat-conductive nature of the copper tends to make the handle and the adjacent opposite portion of the body of the pot too hot to be touched by the fingers. In accordance with a further development of the present invention, therefore, I provide measures whereby the handle remains relatively cool without disturbing the continuity of the protecting metal shell about the ceramic or other relatively brittle article.

According to the invention, the handle and preferably also but not necessarily, the adjoining portion of the body of the pot is provided with a coating of a metal which has a considerably or sensibly lower heat conductivity than copper or other relatively highly heat-conducting metal deposited about the body of the article. As it has a relatively large surface area for its bulk, considerably larger than the body, and by reason of its encasement by the relatively poorly heat-conducting metal, the handle does not then heat up very greatly when a hot liquid such as tea or coffee is poured into the body of the container.

It will be understood that the decorative or surface coating of metal, when such is applied, is continuous over the body and handle of the container, as well as over the spout. The interior of the body of the article is, however, left uncoated.

In forming the metal shell upon and about the article, use may be made of painting and firing, chemical precipitation, electrodeposition, dipping, and/or fused metal spraying, as will be described more fully below.

A metal-coated container produced in accordance with the invention is shown by way of example on the attached drawing, but it will be understood that the same is presented only by way of illustration of one form of the invention and not as indicating the limits of the invention. In said drawing, Fig. 1 is a central vertical section through the coated article and Fig. 2 is a top plan view of the same partly in section, as seen along the line II—II of Fig. 1.

The container as shown generally at 10 is of the type commonly employed in restaurants and hotels for serving one or more portions of hot tea or coffee. The spout is shown at 11 and the handle at 12, while the vitreous or semi-vitreous body of the container, for example, china or porcelain, is indicated at 13. The material of which the container is made is non-conducting in nature and its surface is made conducting by being metallized in any known and suitable way. Thus the outside surface of the whole container may be provided with a coating of a colloidal solution of silver, applied by painting or spraying, and the article then fired in a kiln or oven to expel organic material and cause deposition of metallic silver in an adherent coat upon the surface thereof as shown at 14. However, the metallic coating of silver can be produced chemically in any known manner by double decomposition, as by means of an ammoniacal solution of silver nitrate and formaldehyde, or other reducing agent, after pretreatment of the surface, for example, with a solution of stannous chloride, followed by washing; or according to the method described in the pending application of William T. Joy, Ser. No. 401,635, entitled Process for plating non-conducting articles and products obtained thereby.

Figure 2:
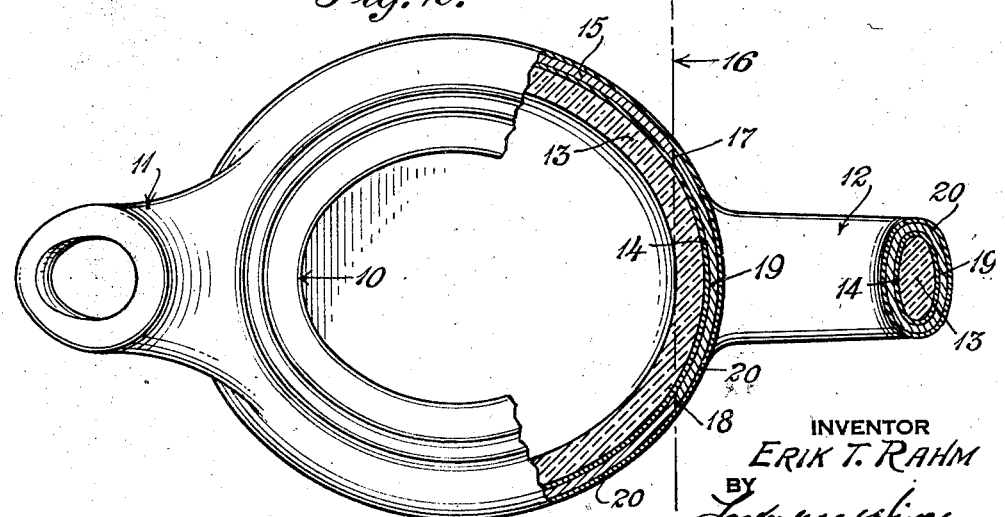

After the surface which is to receive the metallic shell has been thus metallized, the article is suspended in a copper electroplating bath, the article being so supported that only the body thereof is immersed in the bath, the limit of the plating or, in other words, the surface of the bath, being represented by the line 16 in Figs. 1 and 2. All portions of the article below the handle and the adjacent, opposite portion of the body are thereby provided with an electrolytic deposit 15 of copper. The plating is continued until such a thick deposit of copper is produced as to constitute a relatively strong self-sustaining shell. Whereas the silver deposit 14 may be of the order of only about $1/50,000$ of an inch, the deposit of copper may be from about 6 to 16 or more thousandths of an inch. The copper will of course plate only upon those portions of the inside and outside surfaces of the article which have previously been provided with the coating of silver.

The article is now reversed and the handle and adjacent portion of the body are immersed in a plating bath for a metal or alloy of considerably lower heat conductivity than copper, brass being a suitable metal for this purpose. The surface of the brass plating bath extends to substantially the line 16 and there is produced upon the handle and upon the adjacent portion of the body of the article, up to the edges 17, 18 of the copper deposit a layer of brass 19. The deposition is continued until a shell of substantially the same thickness or strength as the copper shell is produced. There is thus obtained a bi-metal coating, one of copper about the body of the container and one of brass about the handle, the two coatings being in metallic contact along the areas 17 and 18.

It will be understood that, as is usual in the plating art, the initial coating of silver may be given a flash of mercury or of nickel in order to facilitate and improve the subsequent deposits. Similarly the copper and brass coatings may be given a flash of mercury or nickel before the next operation.

The whole article, preferably after buffing to provide a highly polished surface (prior to the deposition of the flashing of mercury or nickel) is now immersed in a plating bath for nickel, chromium, silver, gold, or other ornamental metal, and a deposit 20 of such metal of the usual thickness, say several ten-thousandths of an inch, is formed on the previously metallized surfaces. After the usual buffing or polishing operation, the article is ready for use.

The article obtained as just described has a ceramic interior for contact with the beverage but upon the outside surface thereof is provided with a continuous metallic shell which constitutes a reinforcing framework, of unusual strength, particularly at the junctures between the handle and the body of the container. The article possesses furthermore the pleasing surface appearance of metal yet has the solidity combined with relatively light weight associated with ceramic ware. The combined ceramic and metallic structure is capable of resisting shocks that will ordinarily crack or even break the unprotected ceramic article, especially at the handle and spout.

The metal which is to be deposited about the body of the container or utensil should have sufficient rigidity in the thickness of the order mentioned above to impart strength to the container. It should be resilient, so as not to be permanently distorted by shocks and blows. It should adhere firmly, either directly to the non-metallic surface of the container where it is sprayed thereon in the molten condition in known manner or to a base coating of a metal provided on the surface of the non-metallic material. The metal should preferably be one which is easily buffed and of course should be inexpensive. It should also be capable of receiving a deposit of a surface layer of decorative metal if it is not itself to provide the surface finish.

The metal deposited upon the handle and if desired also upon the adjacent portion of the body of the container should have the above characteristics and also the further characteristic of being a considerably poorer conductor of heat. Where this metal is also stronger mechanically than copper, for example brass, it can, of course, be thinner than the copper coating on the body while yet constituting a reinforcing shell. It will be obvious that this reduced thickness will further reduce the flow of heat to and through the handles. In consequence, despite the relatively large area of metallic contact between the metal shell or casing about the handle and that about the body of the container, the low rate of heat transmission and the relatively large surface area of the handle combine to keep the temperature of the handle considerably lower than that of the body of the container. It will thus be seen that the present invention contemplates, among others, a construction in which in the case of containers made of ceramic and similar ware, which itself has a low heat conductivity, where the same is provided with a coating of metal of such thickness that upon filling the container with a liquid which is near to the boiling point of water, the handle would become uncomfortably hot to the touch if the handle were coated with the same relatively highly heat conducting metal as the body, such handle is provided with a relatively poorly conducting layer of metal of a thickness or strength of the order of that of the main coating about the body. The coating about the handle, in addition to the properties above mentioned, should also have sufficient hardness to resist indentation and should have a coefficient of expansion which is not very different from that of the metallic layer about the body of the container. Also, its melting point, like that of the metallic layer about the body, should be sufficiently high so that its strength and other properties will not be impaired by the temperatures to which it will be subjected in use.

A number of metals and alloys, aside from brass, are available for forming the relatively poorly conducting sheathing of metal upon the handle and combine the properties of strength, poor heat-conductivity and elasticity with that of adequate hardness, adhesion and capacity for receiving a surface coating of an ornamental metal. One of the best of such metals is rhodium, whose heat conductivity is 0.21 (calories transmitted per second through plate 1 cm. thick and across an area of 1 cm.$^2$ when the temperature difference is 1 degree C.), being thus lower than that of brass (0.26). Lead has a desirably low conductivity (0.08), but is not quite as satisfactory as rhodium and brass from the standpoint of resilience, hardness and strength. Bronze has a lower conductivity than brass, namely, 0.18, and is also suitable for use on the handle. Among the other metals and alloys that can be employed are German silver, iron, cobalt, nickel, cadmium and tin, all of which have conductivities considerably lower than brass; also zinc, whose conductivity (0.27) is only slightly higher than that of brass. Antimony and bismuth have very low conductivities. Certain of these metals, or metal-like substances, for example, bismuth, cannot be deposited galvanically, or at least not easily, and in such case spraying of the molten metal or dipping in a bath of fused metal, one or more times, may be resorted to, the spraying being continued and the dipping being repeated until a coat of the desired thickness is obtained.

Metals or alloys like rhodium, brass, bronze, etc., can of course be deposited electrolytically, but they may also be deposited in other ways, as by spraying the fused metal. It is, however, preferred to employ a process which deposits the metal in a smooth layer, so as to reduce the cost of buffing and polishing.

The coating of the article by the spraying on of fused metal has the advantage that the deposition of a conducting layer, for example, of silver, is rendered unnecessary and the cost of the process is reduced by the elimination of such metallizing step. Spraying of fused metal may be employed to deposit both the strength-giving layer or layers of metal and also the surface coating of metal. In general, however, I prefer to employ a multi-step process wherein the ceramic or other non-conducting article is first given a conducting layer of silver or other metal by painting or spraying followed by firing, or by a chemical precipitation, after which the further layer or layers of metal may be deposited electrolytically, or otherwise, as described hereinabove. The chemical precipitation of a metal yields a smooth and metallically continuous surface and is distinguished in these important respects over a surface obtained by painting or spraying an emulsion or suspension of a metal upon the article, after which the latter is returned to the kiln for an additional firing, which may consume three to four or more hours at a temperature of about 700° C. and above. This firing increases the brittleness of the ceramic article and is desirably avoided by the chemical precipitation procedure; furthermore, the burning away of the organic or other matter forming the vehicle for the metal to be deposited leaves such metal only in particle, but not in molecular distribution. In other words, the metallic surface is not completely continuous, and, moreover, is not absolutely smooth and requires buffing and thus does not constitute an ideal base for subsequent electrolytic deposition. It is, however, entirely satisfactory for my purposes and has the advantage that the boundary lines can be sharply delimited. In the case of chemical precipitation, the coating is molecularly continuous and is practically as smooth as the original surface of the article, which may be glazed or semi-glazed.

As will be clear from the above, I prefer to form the major or only coating on the handle with a metal having a conductivity of the order of that of brass, say, no higher than about 0.30. It will be realized that by employing the various methods of coating above described and in different combinations, different kinds of simple and compound deposits on the body and handle or handles of the article can be provided, all characterized by the capacity for reinforcing the structure of the article and especially of the handle, and then reducing the flow of heat to and through the handle. As has already been indicated, a single layer of metal may be employed to provide both the strength and the surface finish, provided that it has the necessary low heat conductivity. It is also possible to employ a combination of coatings wherein the material of the coating about the body of the article forms also the surface finish. Thus the body of the article may be provided with a relatively thick coating of aluminum and the handle with one of brass, and the whole article then provided with a coating of aluminum, which may be oxidized or otherwise treated to produce different color effects.

It will be understood that certain features of my invention may be employed without others. Thus, for example, the use of a relatively poorly heat-conducting metal on the handle, compared to the metal encasing the body of the container, need not necessarily be associated with a thickness of metallic coating sufficient to make the coating a self-suporting shell; it is necessary only that the thickness of the coating be of such order that if the coating on the handle were constituted of a highly heat conducting metal, the handle would become uncomfortably hot when the container was filled with a hot liquid. Also, as has already been indicated, the major or the only coating upon the body and handle of the container may consist of one and the same metal, provided that the metal (or alloy) has a heat conductivity not substantially greater than about 0.30 (in the units above defined) and the thickness of the coat is such that if the same were constituted of a highly heat conducting metal, the handle would become too hot to the touch under the same conditions.

It will be seen from the above that my invention is suitable for use with containers, and generally all hollow ware, made of electrically non-conducting materials of various kinds, and not only with those specifically mentioned above. Thus, rubber and terra cotta may be treated in the manner above described. Also, the electrically conducting coating, where electrodeposition is to be employed, may be produced not only by chemical precipitation of a metal but also by the application of various kinds of lacquer, varnish, and other coatings having metallic particles suspended therein, as is well understood in the art.

Other variations from the specific procedures and combinations hereinabove described may be resorted to within the scope of the appended claims without departing from the spirit of the invention.

I claim:

1. A coffee or tea pot of semi-vitreous ware having a body and a handle, a conducting film of silver covering the handle and the outside surface of the body, an electrolytically deposited layer of copper upon the body except the region thereof in the vicinity of the juncture of the body with the handle, an electrolytically deposited layer of a metal of the group consisting of rhodium, brass and cadmium upon the handle and the region on the body in the vicinity of the handle, said two layers being in metallic contact, and a thin film of electrolytically deposited ornamental metal upon the said layers of metal.

2. Process for plating a hollow article having a hollow body and a handle and made of a non-conducting ceramic material, with a metallic coating which is characterized by the feature that the handle remains relatively cool when the body becomes hot, which comprises providing the handle and the outside surface of the body of the article with an electrically conducting surface of silver, immersing only the body of the article in a copper plating bath and depositing a layer of copper thereon, reversing the article and immersing the handle in a plating bath for a metallic material having a heat conductivity no greater than about 0.30, buffing the surface of the article and then immersing the whole article in a plating bath for an ornamental metal and depositing a film of such metal thereon.

3. A coffee or tea pot of semi-vitreous ware having a body and a handle, a conducting film of silver covering the handle and the outside surface of the body, an electrolytically deposited layer of copper upon the body except the region thereof in the vicinity of the juncture of the body with the handle, an electrolytically deposited layer of a metal of the group consisting of rhodium, brass and cadmium upon the handle and the region on the body in the vicinity of the handle, said two layers being in metallic contact, and providing a metallic shell encasing the handle and outer surface of the body, said shell being of such thickness that it constitutes a self-supporting structure which reinforces the body and handle, particularly at the juncture therebetween, and acts to absorb shocks, jars and the like, and a thin film of electrolytically deposited ornamental metal upon the said layers of metal.

4. A receptacle having an integral body and a handle of vitreous material for holding hot liquids, said body only being provided with an electro-deposited protective coating of copper while said body and handle are covered with an electro-deposited coating of at least one metal selected from the group consisting of nickel and chromium, at least the outermost of these layers forming a coherent continuous covering of metal for the outer surface of said body and handle; the absence of copper in the covering on the handle causing said handle to remain cool when a hot liquid is placed in said receptacle.

ERIK T. RAHM.

REFERENCES CITED

The following references are of record in the file of this patent:

UNITED STATES PATENTS

| Number | Name | Date |
| --- | --- | --- |
| 446,590 | Zgaggen | Feb. 17, 1891 |
| 928,224 | Shoemaker et al. | July 13, 1909 |
| 1,558,853 | Eijssen | Oct. 27, 1925 |
| 2,025,528 | Schreiber | Dec. 24, 1935 |
| 2,214,646 | Walker | Sept. 10, 1940 |
| 1,453,489 | Benedek | May 1, 1923 |
| 1,491,879 | Pack et al. | Apr. 29, 1924 |
| 472,230 | Scharling | Apr. 5, 1892 |
| 998,085 | Gibbs | July 18, 1911 |
| 2,089,175 | Adelsperger et al. | Aug. 10, 1937 |

FOREIGN PATENTS

| Number | Country | Date |
| --- | --- | --- |
| 1,166 | Great Britain | 1878 |
| 2,368 | Great Britain | 1914 |
| 829,475 | France | Apr. 5, 1938 |
| 163,264 | Great Britain | Feb. 23, 1922 |